(12) United States Patent
Guest (10) Patent No.: US 7,422,248 B2
(45) Date of Patent: Sep. 9, 2008

(54) COLLETS FOR TUBE COUPLINGS

(75) Inventor: Timothy Stephen Guest, Bray (GB)

(73) Assignee: John Guest International Limited, Middlesex (GB)

( * ) Notice: Subject to any disclaimer, the term of this patent is extended or adjusted under 35 U.S.C. 154(b) by 112 days.

(21) Appl. No.: 11/116,638

(22) Filed: Apr. 28, 2005

(65) Prior Publication Data

US 2005/0264009 A1    Dec. 1, 2005

(30) Foreign Application Priority Data

May 26, 2004  (GB) ................... 0411785.9
Sep. 8, 2004   (GB) ................... 0419962.6

(51) Int. Cl.
    *F16L 21/06*    (2006.01)
(52) U.S. Cl. ................. 285/322; 285/323; 285/423
(58) Field of Classification Search ......... 285/322–323, 285/422–423
    See application file for complete search history.

(56) References Cited

U.S. PATENT DOCUMENTS

| | | |
|---|---|---|
| 2,452,277 A | 10/1948 | Woodling |
| 2,475,741 A | 7/1949 | Goeller |
| 2,640,716 A | 6/1953 | Bigelow |
| 2,728,895 A | 12/1955 | Quackenbush et al. |
| 2,953,398 A | 9/1960 | Haugen et al. |
| 3,107,108 A | 10/1963 | Greene |
| 3,180,664 A | 4/1965 | Franck |
| 3,233,924 A | 2/1966 | Stanley et al. |
| 3,250,550 A | 5/1966 | Lyon |
| 3,334,661 A | 8/1967 | Milette |
| 3,380,765 A | 4/1968 | Himmel |
| 3,454,290 A | 7/1969 | Tairraz |
| 3,552,781 A | 1/1971 | Helland |
| 3,679,241 A | 7/1972 | Hoffmann |
| 3,747,964 A | 7/1973 | Nilsen, Jr. |
| 3,834,742 A | 9/1974 | McPhillips |
| 3,909,046 A | 9/1975 | Legris |
| 3,989,283 A | 11/1976 | Pepper |
| 4,005,883 A | 2/1977 | Guest |
| 4,025,093 A | 5/1977 | Leczycki |
| 4,062,572 A | 12/1977 | Davis |
| 4,136,897 A | 1/1979 | Haluch |
| 4,188,051 A | 2/1980 | Burge |
| 4,253,686 A | 3/1981 | Aitken et al. |
| 4,298,222 A | 11/1981 | Davies |
| 4,305,606 A | 12/1981 | Legris |

(Continued)

FOREIGN PATENT DOCUMENTS

EP    0 663 557 B1    7/1995

(Continued)

*Primary Examiner*—Aaron M Dunwoody
*Assistant Examiner*—Fannie Kee
(74) *Attorney, Agent, or Firm*—Workman Nydegger (57) ABSTRACT

A collet for locking a tube in a tube coupling body is moulded in plastics and comprises an annular collar having a plurality of arms extending from the collar generally parallel to the collar axis. Each arm has a head at its distal end spaced from the collar for engaging between a tube and coupling body to lock the tube in the coupling body. Different materials are used for the heads of the collet and the rest of the collet whereby the heads are stronger and relatively rigid whereas the rest of the collet is relatively flexible.

20 Claims, 8 Drawing Sheets

U.S. PATENT DOCUMENTS

| | | | |
|---|---|---|---|
| 4,309,050 A | | 1/1982 | Legris |
| 4,335,908 A | | 6/1982 | Burge |
| 4,588,214 A | * | 5/1986 | Guest .......................... 285/323 |
| 4,606,783 A | * | 8/1986 | Guest .......................... 156/73.1 |
| 4,613,158 A | | 9/1986 | Ekman |
| 4,637,636 A | | 1/1987 | Guest |
| 4,645,246 A | * | 2/1987 | Guest .......................... 285/323 |
| 4,655,159 A | | 4/1987 | McMills |
| 4,867,489 A | | 9/1989 | Patel |
| 4,993,755 A | | 2/1991 | Johnston |
| 5,056,829 A | | 10/1991 | Kramer |
| 5,121,949 A | | 6/1992 | Reese |
| 5,150,924 A | | 9/1992 | Yokomatsu et al. |
| 5,181,751 A | | 1/1993 | Kitamura |
| 5,217,261 A | | 6/1993 | DeWitt et al. |
| 5,362,110 A | | 11/1994 | Bynum |
| 5,370,423 A | * | 12/1994 | Guest .......................... 285/39 |
| 5,388,866 A | | 2/1995 | Schlosser |
| 5,390,969 A | * | 2/1995 | Guest .......................... 285/38 |
| 5,443,289 A | * | 8/1995 | Guest .......................... 285/39 |
| 5,466,019 A | | 11/1995 | Komolrochanapron |
| 5,569,713 A | * | 10/1996 | Lieberman .................. 525/146 |
| 5,584,513 A | * | 12/1996 | Sweeny et al. .............. 285/323 |
| 5,593,186 A | | 1/1997 | Harris |
| 5,607,190 A | | 3/1997 | Exandier et al. |
| 5,957,509 A | | 9/1999 | Komolrochanapron |
| 6,056,326 A | | 5/2000 | Guest |
| 6,095,572 A | | 8/2000 | Ford et al. |
| 6,109,664 A | * | 8/2000 | Guest .......................... 285/319 |
| 6,193,239 B1 | | 2/2001 | Fukano et al. |
| 6,293,595 B1 | | 9/2001 | Marc et al. |
| 2002/0109353 A1 | | 8/2002 | Guest |
| 2002/0135184 A1 | | 9/2002 | Snyder, Sr. et al. |
| 2003/0006610 A1 | | 1/2003 | Werth |
| 2003/0085568 A1 | | 5/2003 | Guest |
| 2004/0032125 A1 | | 2/2004 | Rehder et al. |

FOREIGN PATENT DOCUMENTS

| | | |
|---|---|---|
| EP | 0 691 503 A3 | 1/1996 |
| EP | 0 756 125 B1 | 1/1997 |
| EP | 0 945 662 A2 | 9/1999 |
| EP | 1 087 168 A1 | 3/2001 |
| EP | 1 233 225 A1 | 8/2002 |
| EP | 1 310 720 A2 | 5/2003 |
| EP | 1 359 362 A1 | 11/2003 |
| EP | 1 359 363 A2 | 11/2003 |
| FR | 2 227 483 | 11/1974 |
| FR | 2 394 736 | 1/1979 |
| FR | 2 689 205 | 10/1993 |
| GB | 1 024 537 | 10/1964 |
| GB | 1 520 742 | 8/1978 |
| GB | 1 573 757 | 8/1980 |
| GB | 2 167 147 A | 5/1986 |
| WO | WO 95/28593 | 10/1995 |

* cited by examiner

COLLETS FOR TUBE COUPLINGS

BACKGROUND OF THE INVENTION

1. Field of the Invention

This invention relates to collets for use in tube couplings for locking the tube in a coupling body and to methods of manufacturing such collets.

2. Background Prior Art

Our UK Patent Specification Nos. 1520742 and 1573757 describe and illustrate a number of forms of collets for locking tubes in coupling bodies. The collets disclosed comprise an annular collar having resilient arms formed with heads at the distal ends of the arms.

The coupling body with which the collet is used has an open ended throughway and the collet is located in the open end of the throughway with the arms extending from the collar into the throughway. The throughway is formed with a tapered cam surface narrowing towards the open end of the throughway with which the arms of the collet engage to be pressed inwardly with movement of the collet outwardly of the throughway. A tube is inserted through the collet into the throughway and the heads of the collet are forced into gripping engagement with the tube by the tapered cam surface to lock the collet in the coupling body.

Other arrangements of collet for locking a tube in a coupling body are described in our European Patent Specification Nos. 0691503, 0663557 and 0756125. In these arrangements a coupling body has an open ended throughway and a collet comprising a collar and resilient arms is located in the throughway with the arms extending towards the open end of the throughway. A tube to be locked in the coupling body has an encircling rib adjacent the end which the heads of the collet arms snap over when the tube is inserted into the coupling body. The heads of the arms engage in slots or abutments formed around the coupling body to prevent the collet from being drawn outwardly of the coupling body and hence the tube is restrained in the coupling body.

The collet is formed from plastics material which has the necessary flexibility to allow the arms to flex as required to grip and release the tube. The flexibility of the collet does impose some restriction on the overall load which the collet can withstand particularly at higher temperatures. An object of the present invention is to provide a collet which can withstand higher loads and particularly at higher temperatures than hitherto available.

SUMMARY OF THE INVENTION

This invention provides a collet for locking a tube in a tube coupling body, the collet being moulded in plastics and comprising an annular collar having a plurality of arms extending from the collar generally parallel to the collar axis, each arm having a head at its distal end spaced from the collar for engaging a tube and coupling body to lock the tube in the coupling body, different materials being used for the heads of the collet and the rest of the collet whereby the heads are stronger and relatively rigid whereas the rest of the collet is relatively flexible.

More specifically the heads and the rest of the collet are formed from the same plastics materials, the heads including a filler to strengthen and increase the rigidity of the plastics material in the heads.

For example the filler may be glass fibres.

Also by way of example the plastics material for the heads and rest of the collet may be nylon, the heads being filled with glass to increase the strength and rigidity of the heads compared with the rest of the collet.

Different plastics materials may be used for the heads and collet, the heads being formed from a relatively rigid and strong plastics material whereas the rest of the collet is formed from a relatively flexible plastics material.

Thus the heads may be formed from glass-filled PPS and the rest of the collet may be formed from unfilled polypropylene or a mineral filled propylene.

In any of the above arrangements inserts of said relatively rigid strong plastics material are moulded into the heads on the collet arms, the insert extending radially through the heads.

In addition the inserts may have metal teeth moulded into the inserts which project from the inner sides of the heads for engaging a tube to be gripped.

The invention also provides a method of making a collet for locking a tube in a tube coupling body and comprising a plastics moulded annular collar having a plurality of arms extending from the collar generally parallel to the collar axis, each arm having a head at its distal end, which method comprises forming (e.g. by moulding) inserts for the heads of the collet connected in a ring in a relatively rigid strong plastics material and then forming (e.g. by moulding) the collet with the insert supported in the ring to be embedded in the heads of the collet in a second, relatively flexible plastics material and then removing the ring to allow the arms to flex independently of one another.

For example the inserts may be moulded on the inner periphery of a ring spaced positions around the ring in said relatively rigid strong plastics material and the ring is used to support the inserts for the moulding the collet and embedding the inserts in the relatively flexible plastics material of the collet but not the ring which is subsequently removed to allow the arms to flex independently of one another.

Additionally metal teeth may be moulded into the insert to project on the inner sides of the insert in the heads of the collet.

Preferably the metal teeth are formed around the inner periphery of an aperture in a metal strip, the ring of plastics inserts is moulded around the aperture on the metal strip and the inserts are moulded around the metal teeth, the strip is then used to support the inserts with their metal teeth with the inserts being embedded in the heads at the distal ends of the collet arms following which the metal strip with the ring of plastics supporting the insert is detached to allow the arms to flex independently of each other.

The periphery of the aperture around the metal strip on which the metal teeth are formed may be cutaway to leave teeth attached to the strip by narrow nibs of metal only to enable the strip to be readily removed following the moulding operation.

The invention also provides a method of injection moulding the collet in which a mould is provided for forming the collet in one piece, high strengths plastics is injected into the moulding to form the heads of the collet followed by a lower strength more resilient plastic for forming the rest of the collet.

The mould can have separate supplies of plastics to provide the two strengths which are required and which are fed alternately to the extruder supplying the mould. Alternatively, separate extruders for each of the plastics can be provided for injecting the high strength and weaker more resilient plastics in a common inlet runner to the mould to form the collet.

BRIEF DESCRIPTION OF THE DRAWINGS

The following is a description of some specific embodiments of the invention, reference being made to the accompanying drawings in which.

Figure 1:
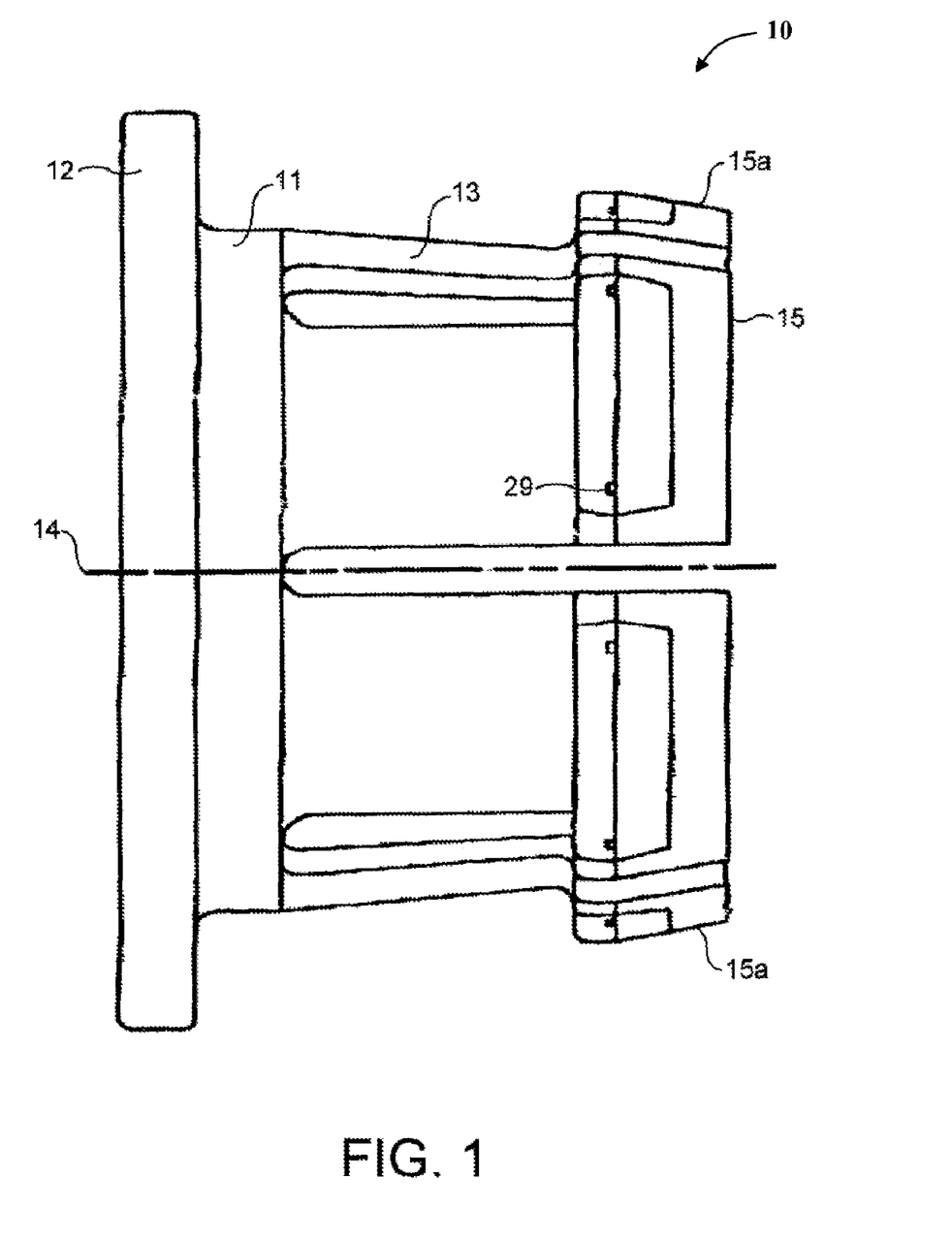
FIG. 1 is a side elevation view of a collet for locking a tube in a tube coupling body in accordance with the invention.
Figure 2:
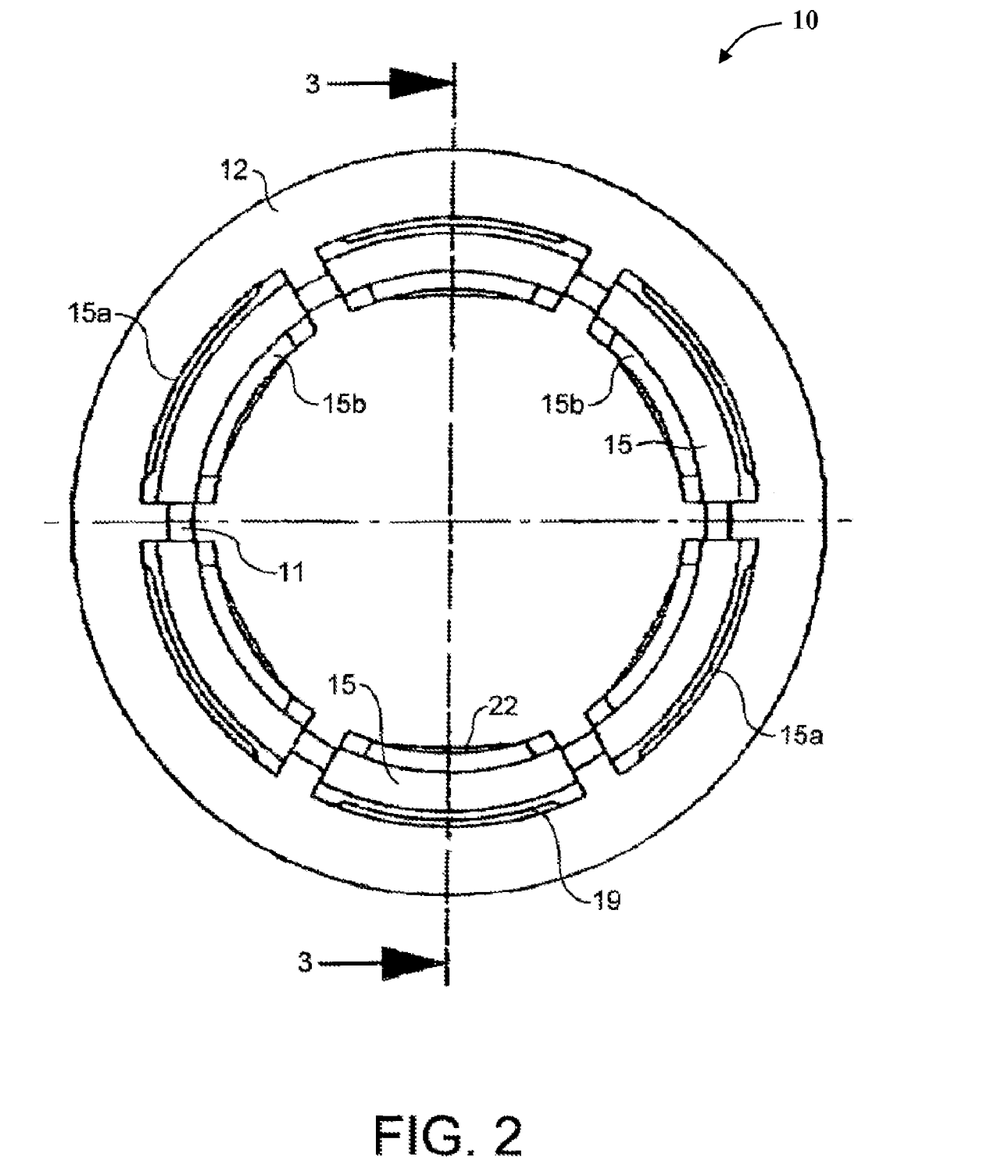
FIG. 2 is an end elevation view of the collet of FIG. 1.
Figure 3:
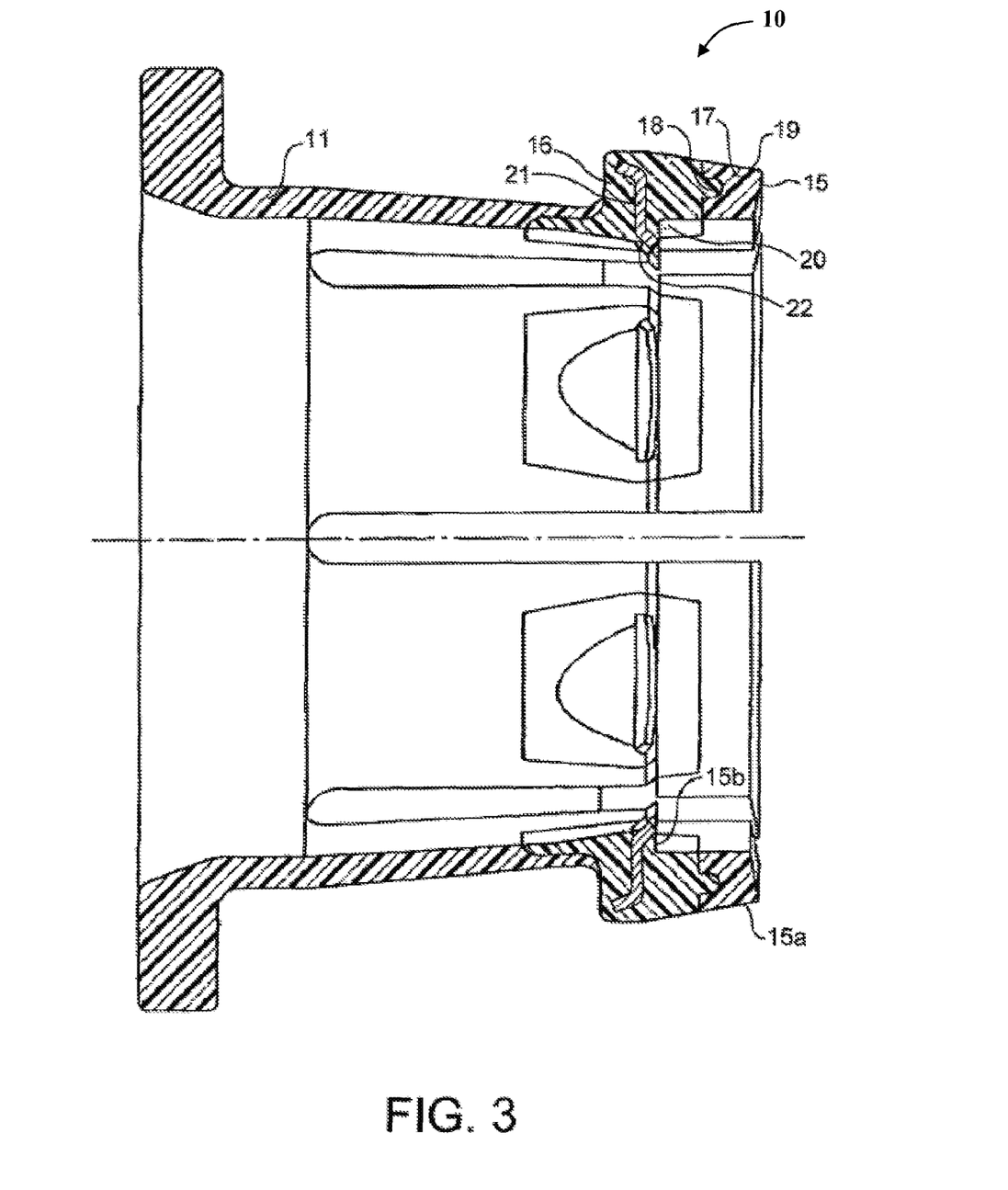
FIG. 3 is a section on the line 3-3 on FIG. 2.

Referring now to FIGS. 1 to 3 of the drawings, the collet is shown indicated generally at 10 comprising an annular collar 11 having an out-turned flange 12 on one side and a plurality of resilient arms 13 extending from the other side generaly parallel to the collet axis which is indicated at 14. At the distal ends of the arms remote from the collar, heads 15 are formed on the arms the outer faces 15a of which are shaped to cooperate with a tapered cam surface in the coupling body in which the collet is to be used to force the arms inwardly into engagement with a tube extending through the collet. The inner sides of the heads formed with a step 15b, in use, will face inwardly of the coupling body. The greater part of the collet including the collar, head, arms and part of the heads at the ends of the collet arms is formed from a relatively flexible plastic material such as nylon or polypropylene with or without a mineral filling. The material is selected to provide adequate strength for the collet but also flexibility in the arms 13 to allow the arms to be deflected inwardly into griping engagement with a tube by the tapered cam surface as mentioned earlier.

The heads 15 of the collet at the ends of the collet arms are formed with inserts 16 moulded in a more rigid plastics material such as glass filled nylon or glass filled polyphenylene sulfide (PPS) to enable the heads to withstand higher loads in the plastics material used for the rest of the collar particularly at higher temperatures.

The inserts 16 extend radially through the heads so that each head comprises the insert 16 and a U-shaped portion 17 the ends of which are integral with the arms of the collet and which is formed in the same material as the rest of the collet. Each insert 16 has a raised rib 18 extending around the sides and bottom of the insert adjacent the U-shaped element 17. The U-shaped element 17 is moulded onto the insert and, in so doing, envelopes the rib 18 so that the insert is positively keyed into the part 17 of the head. The outer surface of the head 15 has an inclined face 19 which engages with the tapered cam surface in the coupling body to force the arms of the collet inwardly into engagement with the tube passing through the collet with slight outward movement of the collet in the coupling body.

The inner side of the insert is formed with a step 20 facing away from the collar 11 of the collet and a Z-shaped metal tooth 21 which is embedded in the insert 16. The inner end 22 of the tooth is angled to project outwardly of the insert at the top of the step 20 and to provide an edge to engage and grip a tube in the collet.

Figure 4:
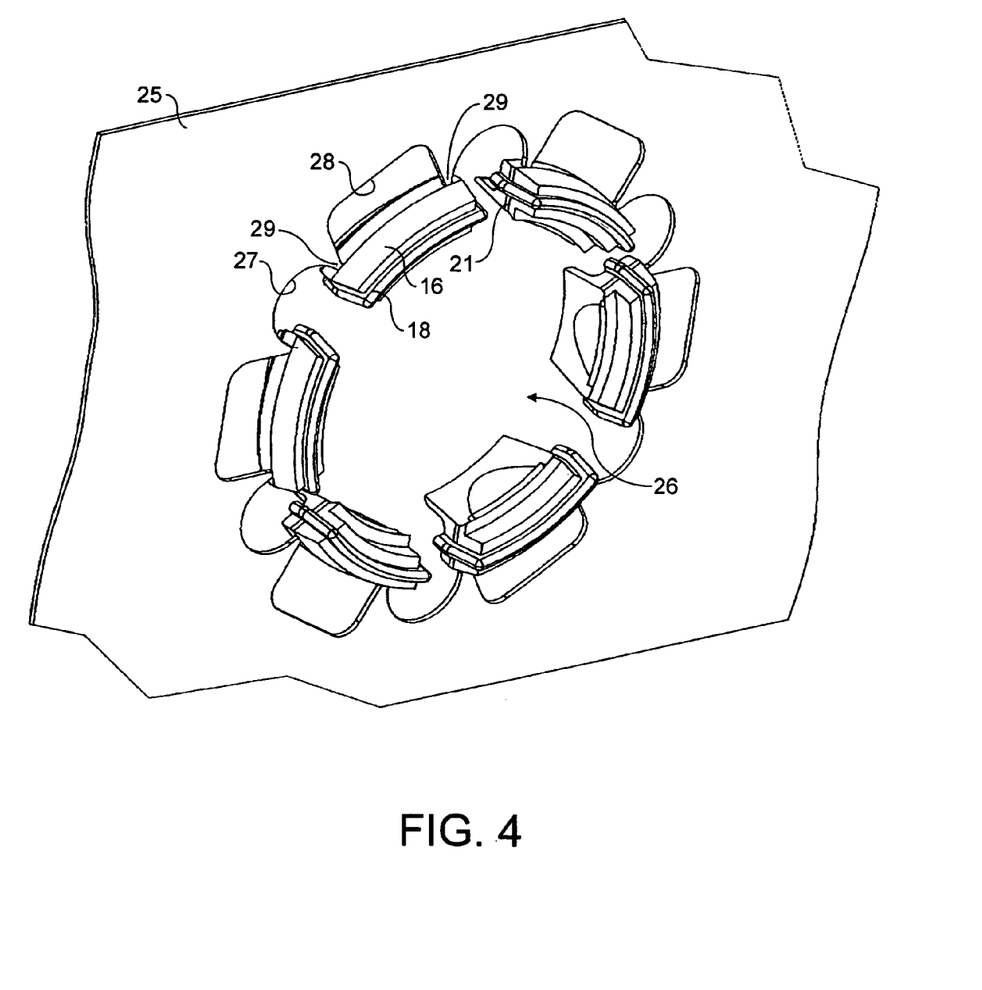
FIG. 4 is a perspective view showing a first stage in the moulding of the collet with elements of the collet supported on a length of strip metal.

Referring firstly to FIG. 4 of the drawings, a strip 25 of stainless steel is used to provide the teeth 21 of the plastic inserts for the heads of the collet and also serves to carry the teeth through the moulding operation. Apertures 26 are punched in the strip with spaced curve recesses 27 to define a series of teeth 21 spaced around the aperture 26 at appropriate positions for the forming of the collet. Deep rectangular apertures 28 are also punched at the outer sides of the teeth leaving the teeth connected to the strip by narrow nibs of metal 29 which can readily be severed when the moulding operation is complete as described later. The punching operation is also used to appreciate teeth 21 to have the slight Z form cross-section which can be seen in FIG. 3.

Figure 5:
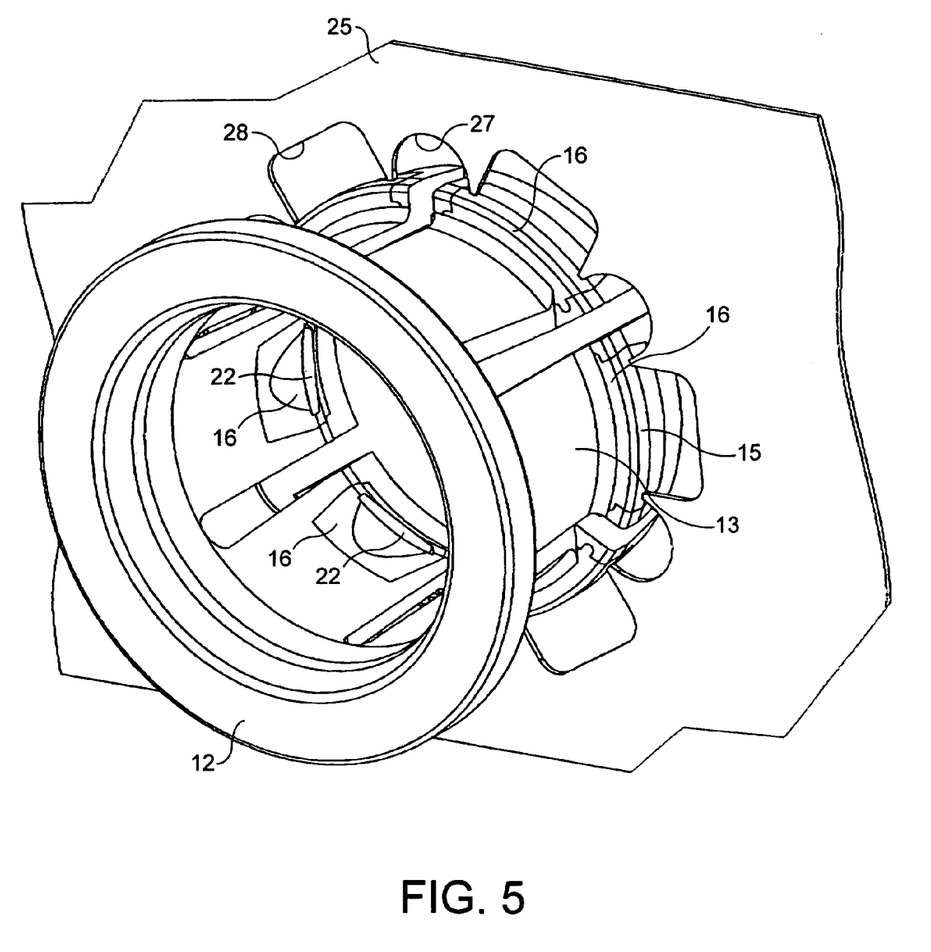
FIG. 5 is a perspective view showing a second stage in the moulding of the collet after completion of the moulding operation with the length of strip metal still present.
Figure 6:
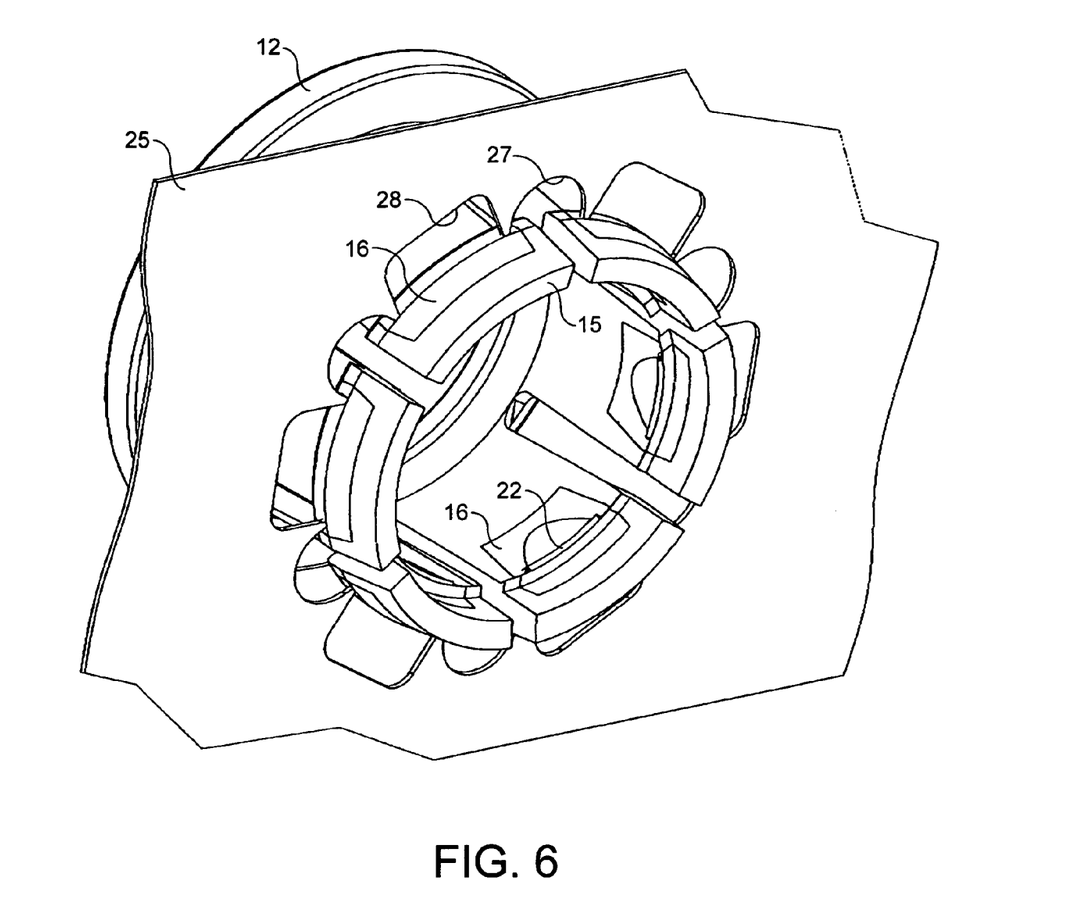
FIG. 6 is a view of the completed moulding from the reverse side of the strip.
Figure 7:
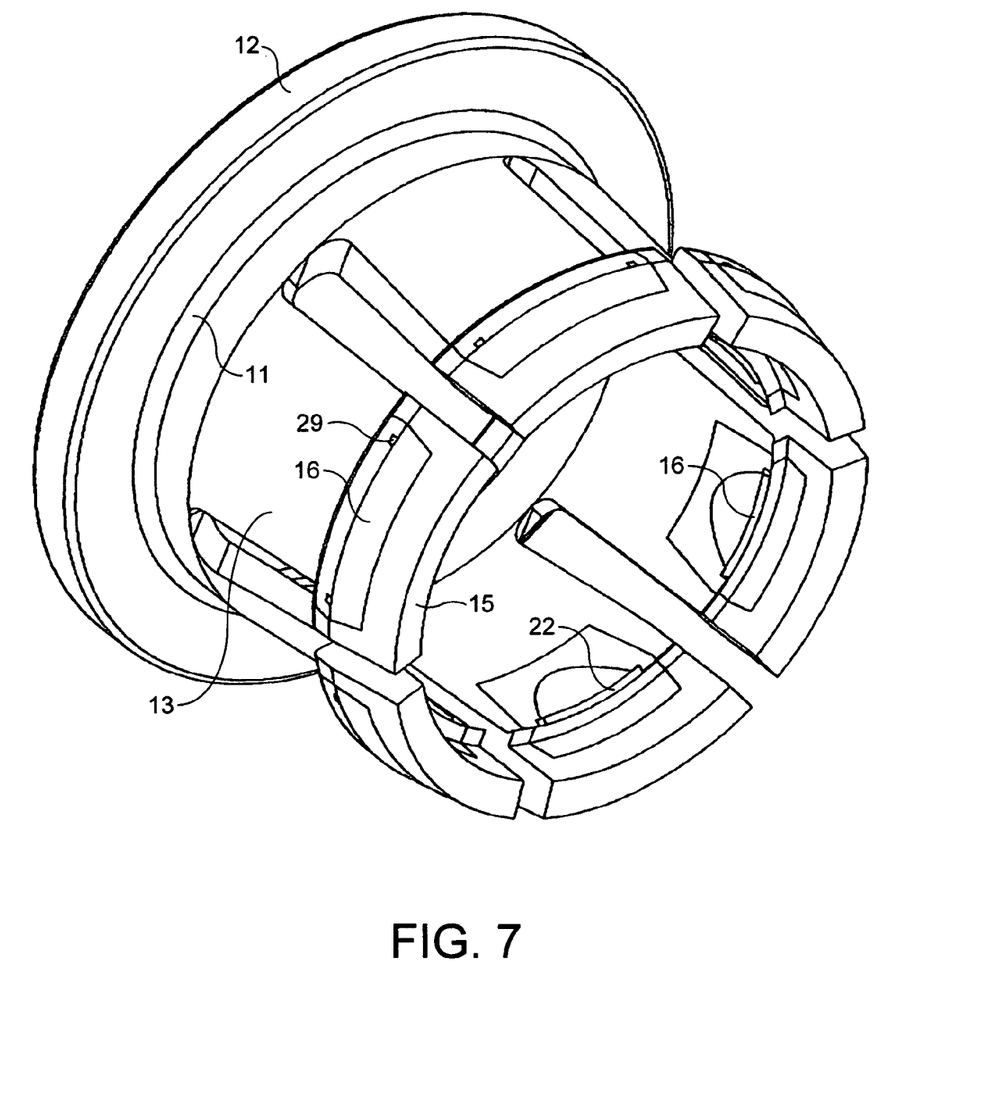
FIG. 7 is a perspective view of the collet following detachment from the strip metal.

The strip is then fed to a moulding machine where the inserts 16 are moulded onto the teeth in a glass filled nylon or glass filled PPS plastics material to provide a relatively rigid and strong body of material in which the teeth 21 are embedded to produce a strip as shown in FIG. 4. The rib 18 encircling each tooth to key into the rest of the head can clearly be seen. The strip then moves in the mould to a moulding station where the rest of the collet is moulded to produce a complete collet as shown in FIGS. 5 and 6. The nibs 29 attaching the strip to the teeth are then severed to leave the completed collet as shown in FIG. 7.

In practice the moulding of the inserts will produce a ring of plastics material around the aperture in the strip which is removed with the strip.

It will be appreciated that many modifications may be made to the above described collet construction and method of producing the collet without departing from the scope of the invention. Other plastics materials may be used and collets can be formed without metal teeth embedded in the inserts.

Furthermore the moulding steps may be carried out in the reverse order. Also the moulding operation could be carried out in one operation first forming the inserts and then the complete collet using the same machine barrel/nozzle.

The invention is also applicable to forming collets for use in the tube couplings described in our European Patent Specification Nos. 0691503, 0663557 and 0756125 (GSL and SL type collets).

Figure 8:
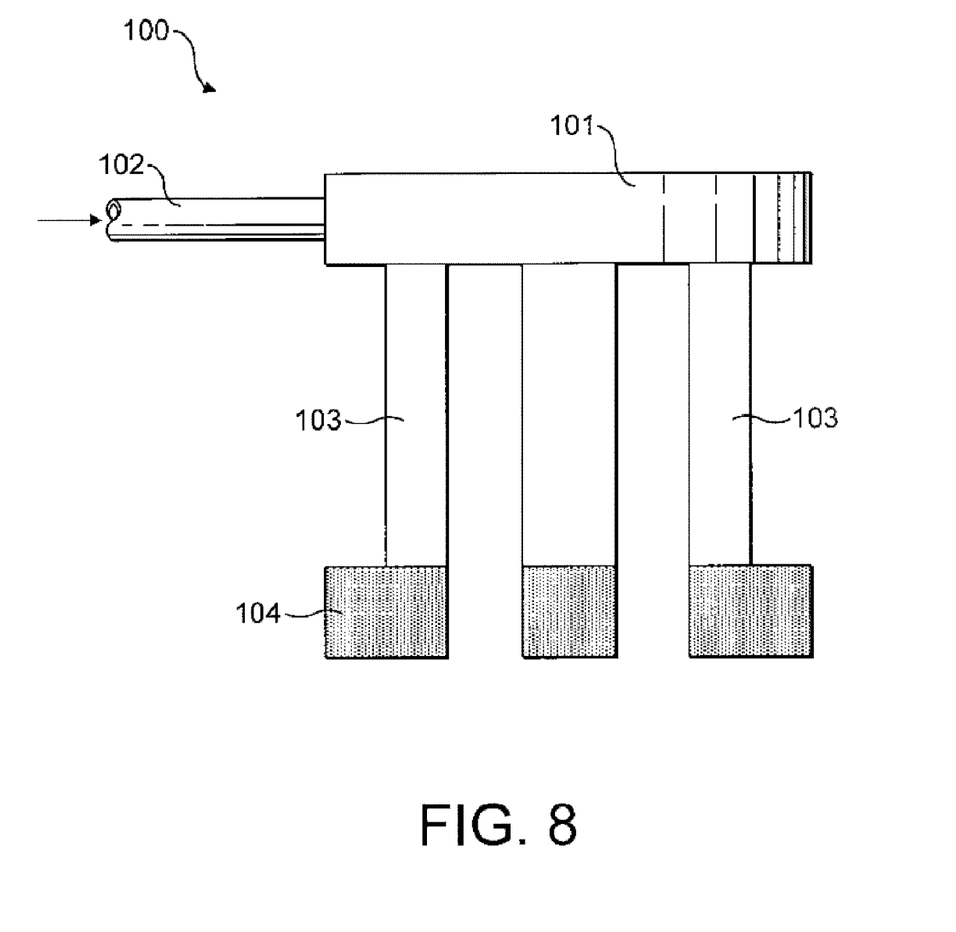
FIG. 8 is a diagrammatic view of one form of injection moulding tool for forming a collet in accordance with the invention.

Referring now to FIG. 8 of the drawings, there is shown in diagrammatic form an injection moulding tool for producing a collet in accordance with the invention. The tool is indicated generally at 100 and comprises an annular cavity 101 designed to mould the collet head and having an inlet runner 102 connected to a screw extruder for feeding plastics material to the mould cavity. Elongate cavities 103 extend from the annular cavity at spaced positions around the cavity coaxially with the axis of cavity to form the collet arms and the distal ends of the elongate cavities have enlarged chambers 104 to form the heads at the ends of the arms.

In carrying out the moulding operation, a high strength plastics material is initially fed by the extruder to fill the chambers 104 and thereby form high strength heads for the collet to the required shape. The high strength plastics material injected into the mould cavity is followed by a lower strength material which forms the arms and annular end of the collet.

Although only one supply extruder is shown in the above apparatus, separate extruders can be provided for supplying the high and low strengths plastics material. The plastics materials may be different but compatible materials or may have the same base material with the high strengths are filled with reinforcing fibres and the low strengths material having no fibre content or a much lower fibre content.

The invention claimed is:

1. A collet for locking a tube in a tube coupling body, the collet being molded from plastics and comprising
   an annular collar having a plurality of arms extending from the collar generally parallel to the collar axis,
   each arm having a head at its distal end spaced from the collar for engaging a tube and coupling body to lock the tube in the coupling body, the heads of the collet being formed from a different plastics material than the rest of the collet whereby the heads are stronger and relatively rigid whereas the rest of the collet is relatively flexible.

2. A collet as claimed in claim 1, wherein the heads include a filler to strengthen and increase the rigidity of the heads.

3. A collet as claimed in claim 2, wherein the filler is glass fibres.

4. A collet as claimed in claim 3, wherein the plastics material for the heads is nylon, the nylon for the heads heads being filled with glass to increase the strength and rigidity of the heads compared with the rest of the collet.

5. A collet as claimed in claim 1, wherein the heads are formed from glass-filled polyphenylene sulfide (PPS) and the rest of the collet is formed from unfilled polypropylene or a mineral filled propylene.

6. A collet as claimed in claim 1, wherein inserts are formed in the heads on the collet arms, the inserts being comprised of the different plastics material and extending through the heads.

7. A collet as claimed in claim 6, wherein said inserts have metal teeth molded into the inserts which project from the inner sides of the heads for engaging a tube to be gripped.

8. A collet as claimed in claim 1, wherein the different plastics material used for the heads of the collet comprises a base plastics material incorporating fibre reinforcement and the rest of the collet is formed from said base material alone.

9. A collet for locking a tube in a tube coupling body, the collet comprising:
   an annular collar having an axis extending therethrough;
   a plurality of arms extending from the collar in a direction generally parallel to the axis of the collar, each arm extending from a proximal end nearest the collar to a spaced apart distal end, the collar and the plurality of arms being formed from a first plastics material; and
   a plurality of heads, each head being disposed at the distal end of a different one of the plurality of arms, each head being formed from a second plastics material that is different from the first plastics material such that the heads are stronger and more rigid than the collar and the plurality of arms.

10. The collet as recited in claim 9, wherein each head forms a ridge.

11. The collet as recited in claim 9, wherein each head includes a filler that strengthens and increases the rigidity of the head.

12. The collet as recited in claim 11, wherein the filler comprises glass fibers.

13. The collet as recited in claim 12, wherein the first plastics material is nylon.

14. The collet as recited in claim 9, wherein the first plastics material comprises unfilled polypropylene or a mineral filled propylene, and the second plastics material comprises glass-filled polyphenylene sulfide.

15. The collet as recited in claim 9, wherein inserts of the second plastics material are formed in each head that extend through the head.

16. The collet as recited in claim 15, wherein the inserts have metal teeth extending therefrom configured to engage a tube.

17. The collet as recited in claim 9, wherein each head has fiber reinforcements formed therein.

18. A collet for locking a tube in a tube coupling body, the collet being molded from plastics and comprising
   an annular collar having a plurality of arms extending from the collar generally parallel to the collar axis,
   each arm having a head at its distal end spaced from the collar for engaging a tube and coupling body to lock the tube in the coupling body, different materials being used for the heads of the collet and the rest of the collet whereby the heads are stronger and relatively rigid whereas the rest of the collet is relatively flexible, wherein different plastics materials are used for the heads and collet, the heads being formed from a relatively rigid and strong plastics material whereas the rest of the collet is formed from a relatively flexible plastics material.

19. A collet as claimed in claim 18, wherein the heads are formed from glass-filled polyphenylene sulfide (PPS) and the rest of the collet is formed from unfilled polypropylene or a mineral filled propylene.

20. A collet for locking a tube in a tube coupling body, the collet being molded from plastics and comprising
   an annular collar having a plurality of arms extending from the collar generally parallel to the collar axis,
   each arm having a head at its distal end spaced from the collar for engaging a tube and coupling body to lock the tube in the coupling body, different materials being used for the heads of the collet and the rest of the collet whereby the heads are stronger and relatively rigid whereas the rest of the collet is relatively flexible, wherein the different materials used for the heads of the collet and the rest of the collet comprise a base plastics material used for the rest of the collet incorporating fibre reinforcement in the material of the heads of the collet.

* * * * *

UNITED STATES PATENT AND TRADEMARK OFFICE
CERTIFICATE OF CORRECTION

PATENT NO.        : 7,422,248 B2
APPLICATION NO.   : 11/116638
DATED             : September 9, 2008
INVENTOR(S)       : Guest Page 1 of 1

It is certified that error appears in the above-identified patent and that said Letters Patent is hereby corrected as shown below:

Column 1
Line 26, change "of collet" to --of a collet--
Line 29, add --,-- after "collet"
Line 30, add --,-- after "arms"

Column 2
Line 57, change "plastics" to --plastic--

Column 3
Line 52, change "U-shaped portion" to --U-shaped element--
Line 58, change "the part" to --the U-shaped element--

Column 5
Line 20, remove the 2nd "heads"

Signed and Sealed this

Eighteenth Day of August, 2009

David J. Kappos
*Director of the United States Patent and Trademark Office*